United States Patent Office 3,179,172
Patented Apr. 20, 1965

3,179,172
CONTROLLED VISCOSITY FRACTURING FLUIDS
Ronald L. Reed, Allison Park, and Joseph J. Taber, Indiana Township, Allegheny County, Pa., assignors to Gulf Research & Development Company, Pittsburgh, Pa., a corporation of Delaware
Filed Nov. 14, 1961, Ser. No. 152,212
19 Claims. (Cl. 166—42)

This invention relates to the treatment of wells such as those drilled for oil or gas, and more particularly the invention relates to the treatment of wells with liquid compositions which have readily controllable viscosity characteristics.

In recent years one of the most commonly employed methods of treating wells to increase the productivity thereof is hydraulic fracturing. As is known, hydraulic fracturing of earth formations is usually accomplished by injecting into the well a liquid, generally of viscous nature, at a rate sufficient to build up within the well a pressure greater than that which the formation can withstand thereby causing the formation to rupture. The rupture of the formation is generally indicated by a sudden drop in pressure on the liquid which is being injected into the well. After the initial breakdown of the formation, displacement of the fracturing liquid into the fracture is continued to extend the fracture for a substantial distance into the formation. After the injection pressure has been released, the fracture produced in the earth formation tends to close due to the weight of the overburden. Granular solids such as sand are usually suspended in the fracturing liquid and injected into the well therewith to keep the fracture open. The granular solids upon being carried into the fracture act as props and hold open the fracture after the injection pressure is released.

For most efficient fracturing, the liquid employed to fracture earth formations should have certain desirable properties, particularly with respect to viscosity. Primarily, the fracturing liquid should be viscous to retard filtration of the liquid into the formation to allow a high pressure to be applied to the earth formation by injecting the fracturing liquid into the well at a reasonable pumping rate. Moreover, granular solid propping materials can be suspended effectively in a fracturing liquid of high viscosity and carried by the liquid into the fracture induced in the formation. While the liquid employed to fracture earth formations should exhibit a relatively high viscosity during the actual fracturing operation, it is also highly desirable that the fracturing liquid should revert to a low viscosity liquid after the fractures have been created to avoid blocking the fracture and the formation adjacent to the fracture. The use of fluid loss agents such as fibrous, lamellar, or granular particles in the fracturing liquid to prevent filtration of the fracturing liquid into the earth formation possesses certain disadvantages. The fluid loss agents which are employed in fracturing liquids must be removed from the fractured formation in order to achieve injectivity into the fracture faces. Moreover, it is frequently found that fluid loss agents can be effectively removed from exposed faces of the formation subsequent to the creation of the fracture when the pressure existing within the earth formation is high, but permanently plug the fracture surfaces of formations at low formation pressures.

The present invention provides improved methods of fracturing earth formations and improved liquid compositions having readily controllable viscosity characteristics. The fracturing compositions of this invention are very viscous during injection into the well and breakdown of the earth formation, and after a fracture has been produced in the earth formation, the viscosity is greatly reduced by relatively minor changes in the composition of the fracturing liquid accomplished by displacement of a different liquid into the fracture or by contamination of the fracturing liquid with formation liquids. The highly fluid liquid readily flows from the fracture and adjacent formation.

The novel fracturing liquids used in this invention are aqueous solutions of certain organic alkylolamides which additionally contain fatty acids or fatty acid soaps and to which highly ionized inorganic compounds have been added. It has been found that the aqueous solutions of the alkylolamides will increase rapidly in viscosity with an increase in the concentration of the highly ionized inorganic compound until a "critical concentration" of the inorganic compound is reached. Further increases in the concentration of the inorganic compound in the aqueous solution cause a very rapid drop in the viscosity of the aqueous solution. The term "critical concentration" used in this specification designates the concentration of the highly ionized inorganic compound at which the effect of further increases in the concentration changes from causing an increase to causing a reduction in the viscosity of the resultant aqueous solution. Thus, by controlling the concentration of water-soluble inorganic compounds present in aqueous solutions of alkylolamides containing fatty acid compounds, high viscosity liquids can be produced which exhibit sufficient fluidal resistance when introduced into a well to permit fracturing pressures to be built up within the formation. Then, after the fracture is created, the fracturing liquid can be transformed by the addition thereto of a highly ionized inorganic compound from a high viscosity liquid to a low viscosity liquid which is fluid enough to flow readily out of the fracture and the formation adjacent the fracture.

The alkylolamides useful in this invention are the condensation products of higher fatty acids and primary or secondary alkylolamines. The higher fatty acids suitable for use in the preparation of the alkylolamides are saturated or unsaturated carboxylic acids having 8 to 18 carbon atoms per molecule. Mixtures of fatty acids such as those that occur in vegetable oils, for example, coconut oil, can be used. Any of the primary or secondary alkylolamines commercially available are suitable for condensation with the higher fatty acids to produce the alkylolamides. Diethanolamine is a preferred secondary amine which can be used in the preparation of the alkylolmides. The preparation of the condensation products of the fatty acids and primary and secondary amines are described in United States Patents Nos. 2,089,-212, 2,429,445 and 2,586,496.

It is essential that a fatty acid compound be incorporated in the novel aqueous solutions. Suitable fatty acid compounds are inorganic and organic compounds containing carboxyl groups having 8 to 18 carbon atoms per molecule. Examples of suitable compounds are the alkali metal soaps, such as sodium stearate and potassium oleate, soaps of organic bases such as diethanolamine, substantially pure fatty acids, such as lauric acid, and mixtures of fatty acids, such as commercially available products of which VR–1 acid sold by Rohm & Haas is typical.

The fatty acid compound may be added to the solution separately or may be present in the alkylolamide as a by-product of the reaction from which the alkylolamide is prepared. By suitable control of the condensation of the fatty acid with the alkylolamine, a mixture of reaction products is obtained which includes alkylolamine soaps. If such soaps are not separated from the alkylolamides, they constitute a satisfactory source of fatty acid compound for use in the aqueous solutions of this invention.

Figure 1:
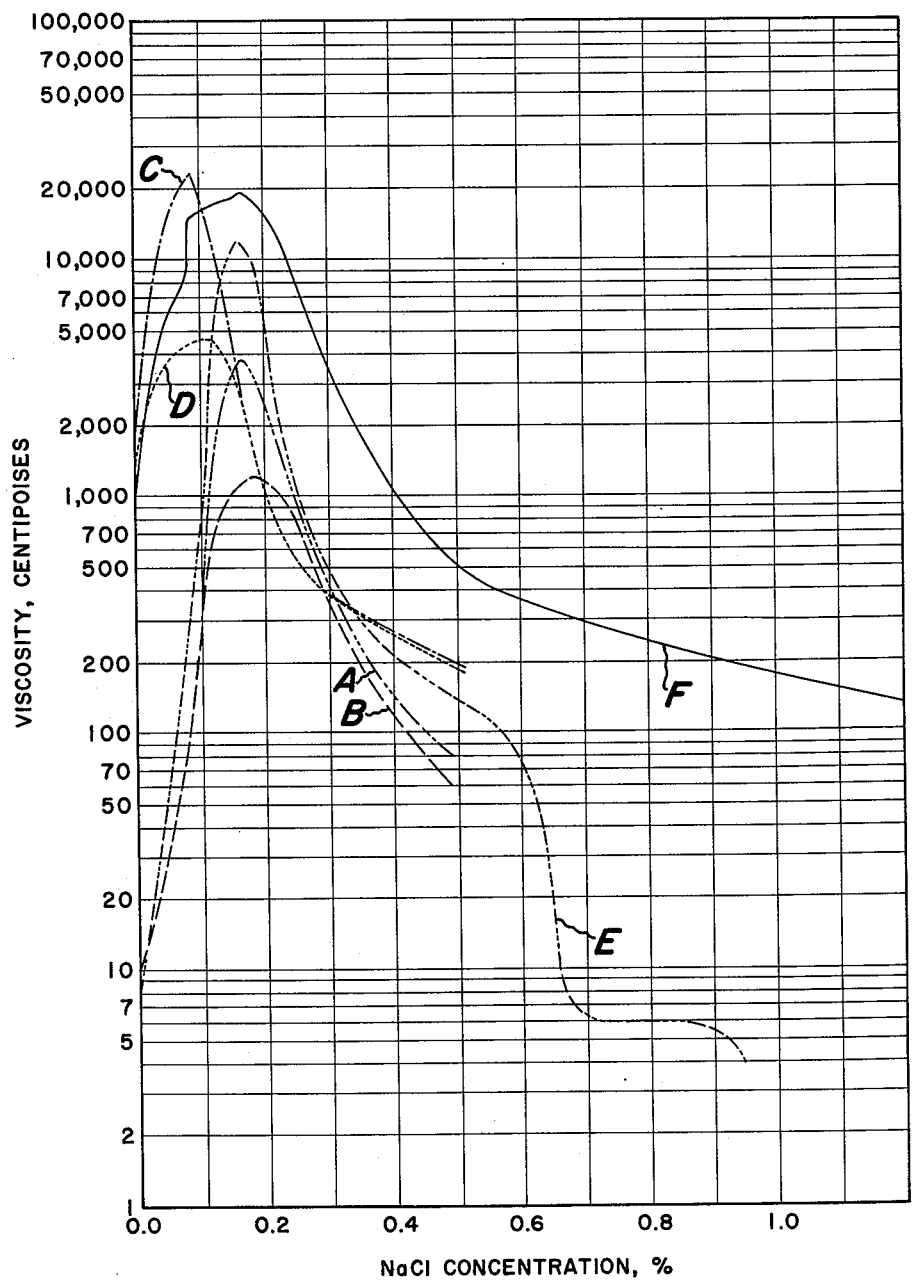
FIGURE 1 is a curve showing the change in viscosity of several different solutions of alkylolamides with changes in concentration of sodium chloride.

The effect of the addition of a highly ionized inorganic compound to aqueous solutions of alkylolamides containing potassium oleate is illustrated in the curves of FIGURE 1 of the drawings. The curve labeled "A" shows the effect on viscosity of the solution of changes in the sodium chloride concentration in an aqueous solution containing 2½ percent of Ninol 2012A, an alkylolamide marketed by the Stepan Chemical Company, prepared by condensation of coconut oil with diethanolamine, and 2½ percent of potassium oleate. The viscosity was measured on a Brookfield Rotational Viscometer operated at a speed of 2 r.p.m. Curve B is for the same solution as curve A but the viscometer was rotated at 20 r.p.m. Curve C is for an aqueous solution containing 5 percent of Ninol 2012A and 5 percent potassium oleate for operation of the viscometer at 2 r.p.m. Curve D is for the solution used in the determination of curve C, but the viscometer was operated at 20 r.p.m. Curves E and F in FIGURE 1 show the effect of changes in sodium chloride concentrations in 5 and 10 percent, respectively, solutions of Solar Regular, an alkylolamide sold by Swift & Company and prepared by the condensation of a coconut oil with diethanolamine. Solar Regular contains products of the condensation reaction other than the alkylolamide; hence, contains fatty acid compounds which make it unnecessary to add fatty acid compounds from an external source.

It will be noted from FIGURE 1 that the addition of sodium chloride to the aqueous solutions of alkylolamide and potassium oleate results in a large increase in the viscosity of the aqueous solution until the concentration of the sodium chloride reaches the critical concentrations, which are about 0.17 for curves A and B, 0.09 for curve C, and 0.11 for curve D. Further increases in the sodium chloride concentration above the critical concentrations resulted in a marked decrease in the viscosity of the aqueous solution. If the sodium chloride concentration is increased beyond the range illustrated in FIGURE 1, the reduction in viscosity continues. For example, the aqueous solution of curve F falls to a viscosity of 9 centipoises if the salt concentration is increased to 2½ percent.

The concentration of the alkylolamide in the fracturing liquid is selected to give a fracturing liquid of the desired viscosity. Because the viscosity of the fracturing liquid will generally increase with the concentration of the alkylolamide in the aqueous solution, the concentration of alkylolamide is most effectively controlled to give the highest viscosity commensurate with the cost of alkylolamide. It is generally desirable that a hydraulic fracturing liquid have a viscosity above 10 centipoises, preferably above 50 centipoises, and ranging up to about 25,000 centipoises or even higher. Concentrations of alkylolamide in excess of about 0.25 percent when combined with the suitable concentrations of the fatty acid compound and the highly ionized inorganic compound are effective in providing aqueous solutions in the desired viscosity range. In many instances, the concentration of the alkylolamide in the aqueous solution will be between 0.25 percent and 5 percent by weight, and preferably between 0.5 percent and 5 percent. Concentrations of alkylolamide higher than 5 percent result in higher costs of the fracturing liquid without a commensurate gain in the viscosity characteristics of the fracturing liquid.

The critical concentration of the salt varies with the concentration of the alkylolamide in the fracturing liquid and to a greater extent with the concentration of the fatty acid compound in the fracturing liquid. As shown in Table I, below, a reduction of the alkylolamide concentration from 4.26 to 0.48 percent by dilution with water, which resulted in a corresponding reduction in the concentration of potassium oleate, changed the critical concentration of sodium chloride from 0.18 for the more concentrated aqueous solution to 0.41 for the less concentrated solution.

TABLE I

| Aqueous Solution | Critical NaCl Concentration, Percent | Viscosity, Centipoises @ Critical NaCl Concentration | |
|---|---|---|---|
| | | 2 r.p.m. | 20 r.p.m. |
| 4.26% Ninol AA62 Extra + 15% K Oleate | 0.18 | 28,000 | 11,000 |
| 1% Ninol AA62 Extra + 3.51% K Oleate | 0.35 | 1,000 | 420 |
| .48% Ninol AA62 Extra + 1.67% K Oleate | 0.41 | 130 | 75 |
| .31% Ninol AA62 Extra + .97% K Oleate | 0.39 | 45 | 25 |

The ability to shift the critical concentration of the highly ionized inorganic compound improves the adaptability of the process for use under different conditions. For example, in some fields the supply of fresh water may be limited, and the formulation of a fracturing liquid having a salt concentration less than 0.18 percent, for example, may be difficult. In those fields, the composition of the fracturing liquid of this invention may be selected whereby the critical salt concentration is higher, for example 0.4 percent, which allows the preparation of a fracturing liquid having a salt concentration below the critical concentration.

The critical concentration of the highly ionized inorganic compound in the novel fracturing liquids of this invention may range from a low of about 0.1 percent to a maximum of about 1.5 percent in aqueous solutions containing a high ratio of fatty acid compound to the alkylolamide.

It is essential that the fracturing liquid contain a fatty acid or fatty acid soap in addition to the alkylolamide if the unique viscosity changes in concentration of highly ionized inorganic compound are to be realized. In Table II data are presented showing the changes in viscosity of several aqueous solutions of alkylolamide with changes in salt concentration. The fatty acid compound concentration should be at least about one-eighth the concentration of the alkylolamide, and for potassium oleate is preferably approximately equal to the concentration of the alkylolamide.

TABLE II

| NaCl Concentration, Percent | Viscosity, Centipoise | | | | | | | |
|---|---|---|---|---|---|---|---|---|
| | 0 | .02 | .04 | .06 | .10 | .15 | 0.2 | 0.3 |
| 1.75% Ninol 2012A | 400 | 250 | 90 | 30 | | | | |
| 4% Ninol 2012A +1% K Oleate | 1,900 | 1,500 | 600 | 290 | 190 | | | |
| 2.5% Ninol 2012A +2.5% K Oleate | 10 | 16 | 28 | 45 | 350 | 1,100 | 1,150 | 330 |

The addition of sodium chloride to an aqueous solution of Ninol 2012A, which contains no potassium oleate, results in a continuous decrease in the viscosity of the solution. Similarly, increases in concentrations of sodium chloride cause reductions in the viscosity of an aqueous solution containing 4 percent Ninol 2012A and 1 percent potassium oleate. However, if the concentration of the potassium oleate is increased to 2½ percent in a 2½ percent solution of Ninol 2012A, a marked increase in the viscosity of the solution is obtained until a critical sodium chloride concentration of about 0.2 percent is reached, after which further increases in the sodium chloride concentration cause a reduction in the viscosity of the solution.

Figure 2:
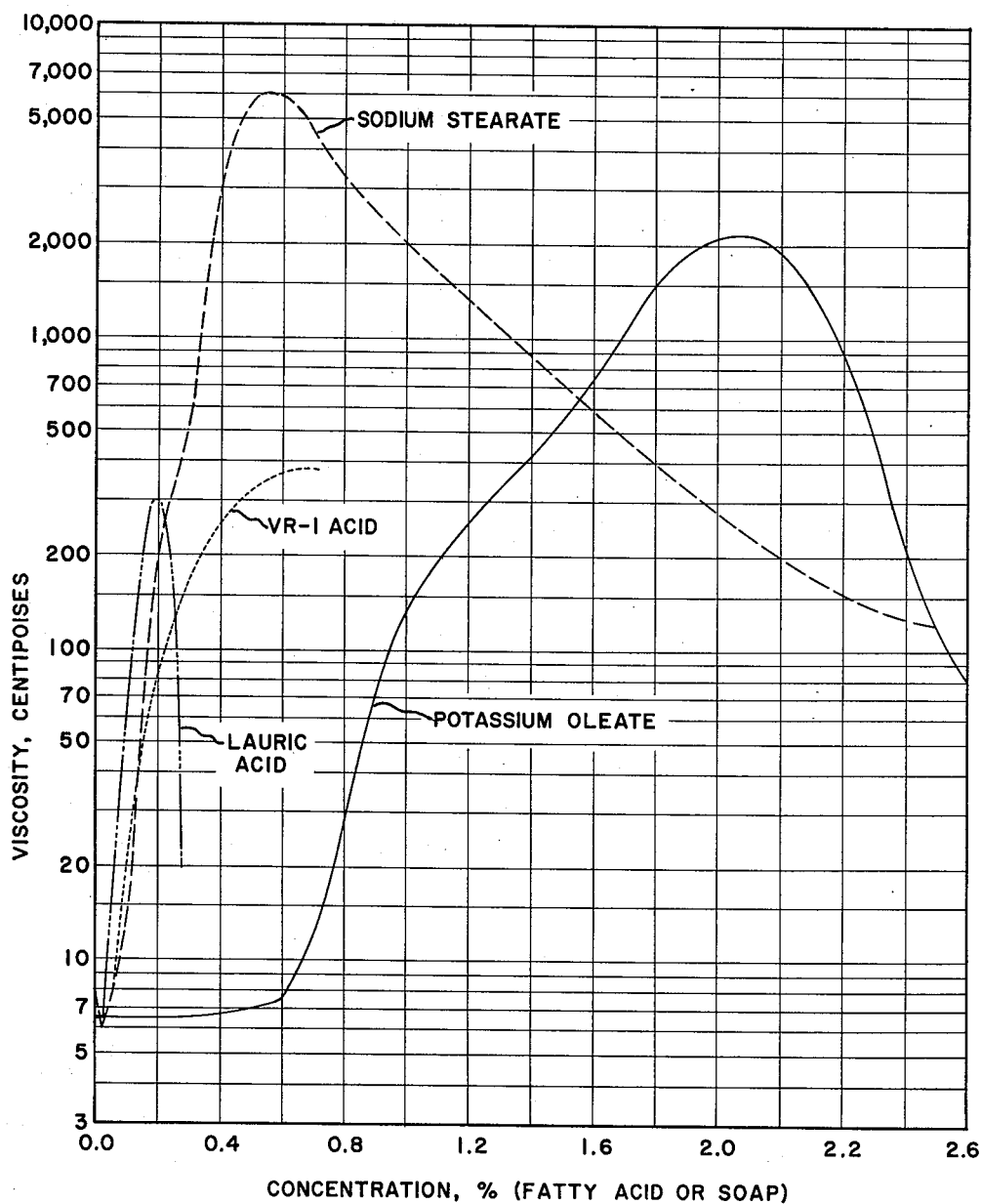
FIGURE 2 is a curve showing the changes in viscosity of an aqueous alkylolamide solution containing a low concentration of sodium chloride caused by additions of different fatty acid compounds.

Fatty acid compounds other than oleates are also effective when combined with the alkylolamides and highly ionized salt to cause the desired changes in viscosity. The increase in the viscosity of a 2½ percent Ninol 2012A solution containing 0.15 percent sodium chloride with the addition of fatty acids or soaps is illustrated in FIGURE 2 of the drawings. It will be noted that lauric acid, a mixture of fatty acids, and sodium stearate, causes increases in viscosity of aqueous solutions of Ninol 2012A at lower concentrations than potassium oleate.

The addition of fatty acid or soap alone to an alkylolamide solution will not cause the desired unique viscosity relationship. In general, the addition of a fatty acid soap to an alkylolamide solution causes a continuous reduction in the viscosity of the resulting solution. In Table III the viscosities of solutions prepared by blending 2 percent Ninol 2012A solutions with the indicated amounts of 2 percent potassium oleate solutions are set forth:

TABLE III

*Viscosity of blends of 2% Ninol 2012A + 2% K oleate solutions*

| Percent K Oleate Solution | 0 | 10 | 20 | 30 | 40 |
|---|---|---|---|---|---|
| Viscosity, Centipoises | 600 | 190 | 12 | 5 | 3 |

Increasing the proportion of the potassium oleate solution in the blend caused a reduction in viscosity of the blend. The unique viscosity characteristics in which the viscosity rises rapidly and then decreases rapidly with slight changes in composition are obtained only when a highly ionized inorganic compound is added to the aqueous solution of an alkylolamide and a fatty acid or fatty acid soap.

Figure 3:
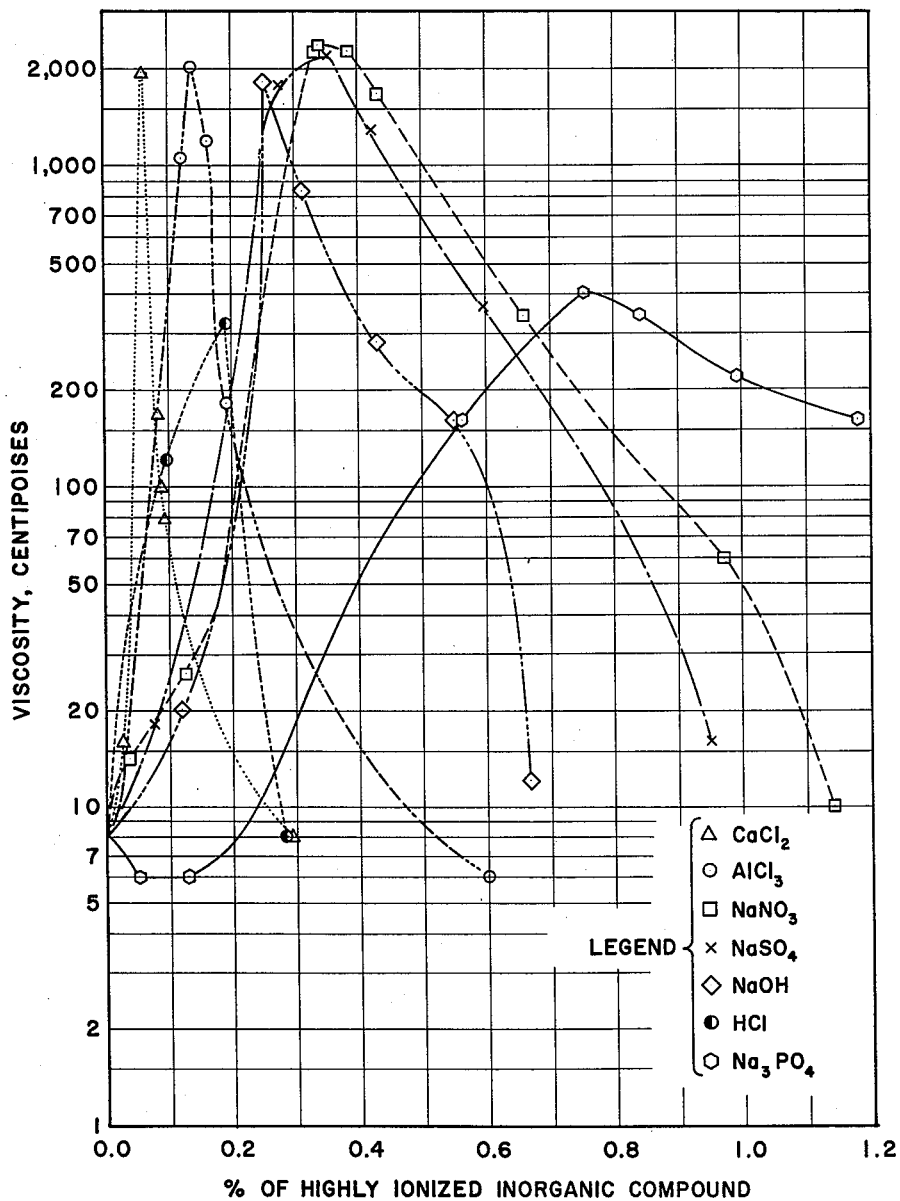
FIGURE 3 is a group of curves illustrating the change in viscosity of a 2.5 percent alkylolamide solution containing 2.5 percent potassium oleate resulting from addition of highly ionized inorganic compounds.

Highly ionized compounds that can be used include the strong electrolytes selected from among the highly ionized inorganic salts, inorganic acids, and inorganic bases, such as sodium chloride, calcium chloride, aluminum chloride, sodium nitrate, sodium sulfate, hydrochloric acid, sodium hydroxide, and tri-sodium phosphate. The effect of the addition of salts other than sodium chloride to an aqueous solution containing 2½ percent Ninol 2012A and 2½ percent potassium oleate is illustrated in FIGURE 3 of the drawings.

The critical salt concentration can be changed to a greater extent by increasing the ratio of the fatty acid soap to alkylolamide than by dilution with water. In Table IV the change in viscosity with change in sodium chloride concentration is presented for an aqueous solution containing 0.5 percent Ninol AA62 Extra and 7.3 percent potassium oleate. Ninol AA62 Extra is an alkylolamide, marketed by Stepan Chemical Company, which is prepared from highly purified lauric acid and diethanolamine.

TABLE IV

| Percent NaCl | 0.6 | 0.8 | 1.0 | 1.2 | 1.4 | 1.6 | 2.0 |
|---|---|---|---|---|---|---|---|
| Viscosity, Centipoises 2 r.p.m. | | | 50 | 136 | 105 | 48 | |
| Viscosity, Centipoises 20 r.p.m. | 8 | 14 | 47 | 110 | 93 | 38 | 17 |

It will be noted that the critical salt concentration of the fracturing liquid is about 1.2 percent, which is approximately three times the critical salt concentration of the 0.48 percent Ninol AA62 Extra solution in Table I.

In carrying out a hydraulic fracturing operation in accordance with the invention, a fracturing liquid comprising an aqueous solution of the specified alkylolamide compounds containing fatty acid compounds and highly ionized inorganic compounds in amounts to produce a composition having low penetrating characteristics is displaced down the well into contact with the formation to be fractured. The fracturing liquid will penetrate the formation but will resist flow therethrough. Accordingly, by continued pumping, a pressure sufficient to fracture the formation can be built up within the formation interstices.

After the fracture is made and extended in the earth formation the proper distance, the fracturing liquid is transformed from a high viscosity liquid to a low viscosity liquid by suitable modification of the concentration of the highly ionized inorganic compound, thereby permitting the liquid to flow out of the fracture. This transformation can be effected in those formations normally containing appreciable quantities of water-soluble inorganic salts, such as brines and the like, merely by exposing the fracturing liquid to the connate formation liquids. When the well is placed back on production, some water is normally produced with the oil. The produced water usually contains high salt concentrations which will reduce the viscosity. In other earth formations, it may be desirable or necessary to expedite the change in fluidity of the fracturing liquid by the introduction into the well of relatively concentrated inorganic salt solutions, such as aqueous solutions of sodium chloride, and the like. Because of the low critical concentrations, the displacement of small amounts of concentrated salt solutions into the fracture will result in sufficient change in salt concentration to cause large reductions in viscosity.

The critical concentration of highly ionized inorganic compound, and change in concentration of such compound, which must be employed to cause transformation of the fracturing liquid from a high viscosity liquid to a low viscosity liquid can be readily determined for any particular alkylolamide solution prior to the hydraulic fracturing operation. FIGURE 1 shows a plot of the apparent viscosity versus inorganic salt concentration of typical fracturing liquid compositions of the invention. Similar curves can readily be obtained for any particular fracturing liquid prepared in accordance with this invention to determine the optimum concentration of the highly ionized inorganic compound. It is preferred that the concentration of the highly ionized inorganic compound in the fracturing liquid be slightly less than the critical concentration.

Any of the solid materials commonly employed in the art as propping agents can be suspended in the fracturing liquids of this invention to be carried thereby into the formation fracture. These granular propping agents will settle out and be deposited within the fracture to maintain the fracture open after the fracturing pressure has been released. Such propping agents include, for example, sand, ceramic materials, metal pellets, rounded nut shell particles, wood chips, glass beads, and the like.

The non-Newtonian character of the fracturing liquids of this invention, illustrated in FIGURE 1 by the higher viscosity when the viscometer operates at lower speeds, is advantageous in fracturing operations. Because of the high rate of shear at the wall of the tubing through which the liquid is pumped down the well, the viscosity of the liquid in that region is reduced, which causes a reduction in the resistance to flow through the tubing. However, the low rate of shear between the fracturing liquid and the propping agent suspended therein results in a high viscosity, which aids in the suspension of the propping agent.

In a specific embodiment of the invention an earth formation having an oil-producing stratum approximately 10 feet thick at a depth of approximately 2340–2350 feet is treated. The fracture is desired in the oil-producing stratum at approximately 2346 feet. A packer is set in the well on the tubing to isolate and confine the selected interval at which the fracture is desired. A fracturing liquid comprising water containing 0.15 percent sodium chloride and 5 percent Solar Regular is pumped into the well at a rate of about 15 barrels per minute. The fracturing liquid is continually injected into the well at this rate until the pressure is adequate to cause the formation to fracture which is indicated by a sudden decrease in pump pressure. After the fracture occurs, a propping agent consisting of Ottawa sand of about 12–20 mesh particle size is injected into the fracturing liquid. The propping agent is mixed with the fracturing liquid as it is injected into the well at a rate to provide about three pounds of propping agent per gallon of fracturing liquid. The fracturing liquid containing the propping agent is continuously pumped into the well to extend the fracture and to deposit the propping agent therein. Thereafter, the fracturing liquid is transformed from a high-viscosity liquid to a low-viscosity liquid by injecting a salt water brine containing 10 percent sodium chloride into the well to commingle with the fracturing liquid. The brine causes the fracturing liquid to revert to a highly fluid liquid which is easily withdrawn from the well during subsequent production. The sand particles are deposited within the fracture to maintain the fracture open.

A particularly advantageous application of the present invention is in the treatment of water injection wells. If the water injection well is for the disposal of oil field brines, for example, the brines may directly follow the fracturing liquid and will reduce the viscosity of the fracturing liquid to permit easy displacement of the brine into the underground formation. If fresh water is to be injected through the well, the fresh water may follow the fracturing liquid and accomplish the desired viscosity reduction by reduction of the concentration of the highly ionized inorganic compound, or a slug of a brine, preferably concentrated, may be positioned between the fracturing liquid and the fresh water. A further advantage of the alkylolamide components of the fracturing liquids of this invention is that they function as surfactants and in this capacity serve to clean up the fracture faces, thereby increasing the water injectivity.

It is to be understood that the foregoing description of a specific embodiment of the invention is by way of illustration only and that various modifications and variations can be made in the fracturing technique without departing from the invention. The invention can be utilized to fracture oil, gas, or water formations to produce therein "clean" or uncontaminated fractures of exceptionally high permeability. The fracturing technique of the invention is extremely valuable in secondary recovery operations employing gas or water drives where it is desired to improve the permeability of the formation.

We claim:

1. A method of fracturing a subsurface formation penetrated by a well, comprising displacing down a well and into contact with the subsurface formation a fracturing liquid consisting essentially of water, an alkylolamide, a fatty acid compound selected from the group consisting of fatty acids having 8 to 18 carbon atoms per molecule and soaps of such fatty acids, and a strong electrolyte comprising a highly ionized inorganic compound at substantially the critical concentration giving the fracturing liquid its maximum viscosity; applying a pressure to the fracturing liquid adequate to overcome the overburden pressure and strength of the formation to fracture the formation; displacing fracturing liquid into the fracture to extend the fracture in the formation; mixing an aqueous solution containing a concentration of highly ionized inorganic compound different from the concentration in the fracturing liquid with the fracturing liquid in the fracture to decrease substantially the viscosity of said fracturing liquid in a short time; and removing the mixture of aqueous solution and fracturing liquid from the fracture.

2. A method as set forth in claim 1 in which a propping agent is suspended in the fracturing liquid.

3. A method as set forth in claim 1 in which the highly ionized inorganic compound is chosen from a group of strong electrolytes consisting of highly ionized inorganic bases, inorganic acids, and inorganic salts.

4. A method of fracturing a subsurface formation penetrated by a well, comprising displacing down a well and into contact with the subsurface formation a fracturing liquid consisting essentially of water, an alkylolamide, a fatty acid compound selected from the group consisting of fatty acids having 8 to 18 carbon atoms per molecule and soaps of such fatty acids, and a strong electrolyte comprising a highly ionized inorganic compound in a concentration near the critical concentration given the fracturing liquid its maximum viscosity; applying a pressure to the fracturing liquid adequate to overcome the overburden pressure and strength of the formation to fracture the formation; displacing fracturing liquid into the fracture to extend the fracture into the subsurface formation; dispensing an aqueous solution containing a highly ionized compound in a concentration substantially different from the critical concentration down the well and into the fracture to mix with the fracturing liquid in the fracture and greatly decrease the viscosity of said fracturing liquid; and thereafter removing the fracturing liquid from the fracture.

5. A method as set forth in claim 4 in which the concentration of highly ionized inorganic compound in the aqueous solution displaced into the well subsequent to the fracturing is higher than the critical concentration of the highly ionized inorganic compound in the fracturing liquid.

6. A method of fracturing a subsurface formation penetrated by a well, comprising displacing down the well and into contact with the subsurface formation a fracturing liquid consisting essentially of water and at least about 0.25 percent of an alkylolamide, a fatty acid compound selected from the group consisting of fatty acids having 8 to 18 carbon atoms per molecule and soaps of such fatty acids, and a strong electrolyte comprising a highly ionized inorganic compound in a concentration slightly less than the critical concentration; said fracturing liquid having a viscosity of at least about 50 centipoises; applying a pressure to the fracturing liquid adequate to create a fracture in the formation; displacing fracturing liquid into the fracture to extend the fracture in the formation; and thereafter mixing an aqueous solution having a concentration of the highly ionized inorganic compound substantially higher than the critical concentration with the fracturing liquid in the fracture to decrease substantially the viscosity of said fracturing liquid; and thereafter removing the fracturing liquid from the fracture.

7. A method as set forth in claim 6 in which the concentration of the fatty acid compound in the fracturing liquid is at least about one-eighth the cencentration of the alkylolamide and is adequate to produce a fracturing liquid having a viscosity highly sensitive to the concentration of the highly ionized inorganic compound; and the highly ionized inorganic compound in the fracturing liquid is sodium chloride in a concentration between 0.10 and 1.5 percent.

8. A method as set forth in claim 6 in which the alkylolamide is a condensation product of at least one fatty acid having 8 to 18 carbon atoms per molecule and diethanolamine.

9. A method of fracturing a subsurface formation penetrated by an injection well, comprising displacing down the injection well and into contact with the formation a fracturing liquid consisting essentially of water, an alkylolamide, a fatty acid compound selected from the group consisting of fatty acids having 8 to 18 carbon atoms per molecule and soaps of such fatty acids, and a strong electrolyte comprising a highly ionized inorganic compound in a concentration just below the critical concentration; applying pressure to the fracturing liquid adequate to overcome the overburden pressure and strength of the formation to create a fracture in the formation; displacing fracturing liquid into the fracture to extend the fracture in the formation; displacing down the well and into the fracture to greatly decrease in a short time the viscosity of the fracturing liquid in the fracture an aqueous solution of a highly ionized inorganic compound in a concentration sufficient to raise the concentration of the highly ionized inorganic compound in the fracturing liquid in the fracture to a value exceeding the critical inorganic compound concentration of the fracturing liquid; and thereafter injecting a fluid down the well through the fracture and into the formation.

10. A method of fracturing a subsurface formation penetrated by a well comprising displacing down the well and into contact with the formation a fracturing liquid containing water, an alkylolamide, a fatty acid compound selected from the group consisting of fatty acids having from 8 to 18 carbon atoms per molecule and soaps of such fatty acids, and a strong electrolyte comprising a highly ionized inorganic compound, the concentration of said highly ionized inorganic compound in the fracturing liquid being substantially equal to the critical concentration, applying a pressure to the fracturing liquid adequate to fracture the formation and displace fracturing liquid into the fracture, reducing substantially the viscosity of the fracturing liquid in a short time by displacing downwardly through the well and into the fracture an aqueous liquid having a concentration of the inorganic compound substantially less than the critical concentration, and removing the mixture of aqueous liquid and fracturing liquid from the fracture.

11. A method according to claim 10 in which the aqueous liquid used to reduce the viscosity of the fracturing liquid in the fracture is water.

12. A method for fracturing a subsurface formation penetrated by a well comprising displacing down the well and into contact with the formation a fracturing liquid containing water, an alkylolamide in concentration of 0.5 to 5.0 percent, a fatty acid compound selected from the group consisting of fatty acids having from 8 to 18 micron atoms per molecule and soaps of such fatty acids in a concentration at least one-eighth the concentration of the alkylolamide, and a strong electrolyte comprising a highly ionized inorganic compound in a concentration near the critical concentration, applying pressure to the fracturing liquid to fracture the formation and displacing fracturing liquid into the fracture; reducing substantially the viscosity of said fracturing liquid in a short time by displacing down the well and into the fracture an aqueous solution containing a quantity of the highly ionized inorganic compound substantially higher than the critical concentration in an amount sufficient to raise the concentration of said compound in the fracturing liquid in the fracture to a concentration greater than the critical concentration; and removing the mixture of aqueous solution and fracturing liquid from the fracture.

13. A method as set forth in claim 12 in which the highly ionized inorganic compound in the fracturing liquid is hydrochloric acid in a concentration between 0.05 and 0.20 percent.

14. A method as set forth in claim 12 in which the highly ionized inorganic compound in the fracturing liquid is sodium hydroxide in a concentration between 0.20 and 0.60 percent.

15. A method as set forth in claim 12 in which the highly ionized inorganic compound in the fracturing liquid is sodium nitrate in a concentration between 0.20 and 0.90 percent.

16. A method as set forth in claim 12 in which the inorganic compound in the fracturing liquid is trisodium phosphate in a concentration between 0.50 and 1.20 percent.

17. A method as set forth in claim 12 in which the highly ionized inorganic compound in the fracturing liquid is sodium sulfate, in a concentration between 0.15 and 0.80 percent.

18. A method as set forth in claim 12 in which the highly ionized inorganic compound in the fracturing liquid is a calcium chloride in a concentration between 0.04 and 0.10 percent.

19. A method as set forth in claim 12 in which the highly ionized inorganic compound in the fracturing liquid is aluminum chloride in a concentration between 0.07 and 0.25 percent.

References Cited in the file of this patent

UNITED STATES PATENTS 2,596,845    Clark _____ May 13, 1952

FOREIGN PATENTS 547,878    Canada _____ Oct. 22, 1957

UNITED STATES PATENT OFFICE
CERTIFICATE OF CORRECTION

Patent No. 3,179,172                       April 20, 1965

Ronald L. Reed et al.

It is hereby certified that error appears in the above numbered patent requiring correction and that the said Letters Patent should read as corrected below.

Column 2, line 58, for "alkylolmides" read -- alkylolamides --; column 9, line 41, for "micron" read -- carbon --.

Signed and sealed this 21st day of September 1965.

(SEAL)
Attest:

ERNEST W. SWIDER                          EDWARD J. BRENNER
Attesting Officer                            Commissioner of Patents